United States Patent [19]

Salice

[11] Patent Number: 5,246,322
[45] Date of Patent: Sep. 21, 1993

[54] FASTENING ELEMENT COMPRISING A DOWEL-SHAPED SLEEVE

[75] Inventor: Luciano Salice, Carimate, Italy

[73] Assignee: Arturo Salice S.p.A., Novedrate Como, Italy

[21] Appl. No.: 918,237

[22] Filed: Jul. 23, 1992

[30] Foreign Application Priority Data

Jul. 25, 1991 [DE] Fed. Rep. of Germany ....... 4124727

[51] Int. Cl.$^5$ ................................................ F16B 13/04
[52] U.S. Cl. ....................................... 411/15; 411/57; 411/349
[58] Field of Search ................. 411/349, 15, 182, 347, 411/44, 57, 32, 33

[56] References Cited

U.S. PATENT DOCUMENTS

| | | |
|---|---|---|
| 3,272,061 | 9/1966 | Seckerson ...................... 411/349 X |
| 3,421,404 | 1/1969 | Jacobs . |
| 3,505,922 | 4/1970 | Tinnerman ............................ 411/57 |
| 3,964,364 | 6/1976 | Poe ................................. 411/349 X |
| 4,007,516 | 2/1977 | Coules ................................. 411/349 |
| 4,288,189 | 9/1981 | Ziaylek, Jr. ......................... 411/180 |
| 4,478,545 | 10/1984 | Mizusawa et al. ............... 411/182 X |
| 4,610,587 | 9/1986 | Wollar et al. .................... 411/182 X |
| 4,862,556 | 9/1989 | Gross ................................... 16/382 |
| 4,982,476 | 1/1991 | Salice .................................. 16/382 |

FOREIGN PATENT DOCUMENTS

| | | |
|---|---|---|
| 0169173 | 5/1985 | European Pat. Off. . |
| 1941888 | 5/1966 | Fed. Rep. of Germany . |
| 3029762 | 8/1980 | Fed. Rep. of Germany . |
| 3311223 | 3/1983 | Fed. Rep. of Germany . |
| 3717376 | 5/1987 | Fed. Rep. of Germany . |
| 8707084 | 5/1987 | Fed. Rep. of Germany . |
| 3841933 | 12/1988 | Fed. Rep. of Germany . |
| 8717482 | 12/1988 | Fed. Rep. of Germany . |
| 2544410 | 4/1983 | France . |
| 1291990 | 10/1972 | United Kingdom .................. 411/15 |

Primary Examiner—Rodney M. Lindsey
Attorney, Agent, or Firm—Morgan & Finnegan

[57] ABSTRACT

A fastening element for a member provided with a fastening bore, preferably for a hinge member, consists of a dowel-shaped sleeve insertable in a pre-drilled hold, in the through hole of which a pin provided with a head can be locked by about a quarter turn. To achieve a fast and easy assembly, the sleeve consisting of elastic material is provided in the vicinity of its tubular shank with a least one longitudinally extending slot. In the slotted portion the hole has a longitudinal cross-section. The shank of the pin has at least one section with a diameter approximately corresponding to the cross-section of the hole, which on its opposing narrower sides is provided with peripherally extending thread-like cutting webs.

7 Claims, 3 Drawing Sheets

FASTENING ELEMENT COMPRISING A DOWEL-SHAPED SLEEVE

TECHNICAL FIELD

The invention relates to a fastening element for a member provided with a fastening bore, preferably for a hinge member, comprising a dowel-shaped sleeve insertable in a predrilled hole, in the through hole of which a pin provided with a head can be locked by about a quarter turn.

BACKGROUND ART

In the industrial manufacture of furniture it is required that fittings and in particular hinges can be mounted easily and quickly with a good and tight fit. Conventional fastening screws, even those provided with dowels, cannot satisfy this requirement, because the screws must be screwed in with several turns until they have a tight fit, which is complicated and time-consuming even when motor-driven screw drivers are used.

In a fastening element of the above-mentioned type known from the DE-GM G 87 17 482.0 the dowel-shaped sleeves are urged into pre-drilled holes such that they are firmly anchored therein. The through holes of the sleeves are provided with undercut steps, with which hammer-like cross members of the pins are in locking engagement. This known fastening element provides for a fast assembly. But the pre-assembled sleeves can only be anchored sufficiently by urging them into the pre-drilled holes, when close manufacturing tolerances are observed. In addition, pre-assembled sleeves are frequently undesired, as they are also mounted at points which are not required.

DESCRIPTION OF THE INVENTION

It is the object of the invention to create a fastening element of the above-described kind, which can be mounted easily and quickly with a tight fit.

In accordance with the invention this object is solved in a fastening element of the generic type in that the sleeve consisting of an elastic material is provided in the vicinity of its tubular shank with at least one longitudinally extending slot, and the hole in the slotted portion has a longitudinal cross-section, and that the shank of the pin has at least one portion with a cross-section more or less corresponding to the cross-section of the hole, which on its opposing narrower sides is provided with peripherally extending thread-like cutting webs. The fastening element in accordance with the invention can be mounted easily and quickly, without having to observe close tolerances which make the manufacture thereof expensive. The sleeve is inserted into the pre-drilled hole, and the pin serving as retaining element is urging the slotted shank of the sleeve apart by means of a rotation by about 90 degrees, due to its eccentricity symmetrical with respect to its axis of rotation, such that the sleeve is frictionally held in the bore. The pin itself is safely anchored in the sleeve after a quarter turn, because its cutting webs provided at its rounded narrow sides cut into opposing wall portions of the through hole of the sleeve.

The fastening element in accordance with the invention furthermore has the advantage that it can be easily released, because the connection can be released again by turning the pin back by about a quarter turn.

Expediently, the opposing walls on the side of the hole of the sleeve which is broader in cross-section are formed by embedded metal strips. Said metal strips are anchored at the sleeve, and the cutter-like members of the retaining pin are cutting into said metal strips during their rotation by about 90 degrees. The hardness of the pin and the metal strips is expediently chosen such that the cutting edges of the pin can cut deeply enough into the metal strips.

Expediently, the shank of the pin has the shape of the shank of a self-cutting screw, whose threads are cut away on opposing sides. The opposing sides can be flattened beyond the base of the threads. In this way, the pin constitutes the shape of a two-wing eccentric symmetrical with respect to a longitudinal central plane, which during its rotation uniformly urges apart opposing shell portions of the sleeve.

Expediently, the shank of the pin has thus the cross-section of a rectangle with rounded narrow sides.

The sleeve can be made of metal. However, it advantageously consists of plastic material.

Expediently, the metal strips embedded in the sleeve are connected with each other in a U-shaped manner by means of a web, so that they constitute a one-piece insert.

The metal strips can consist of a U-shaped insert, whose web portion connecting the strips is sealing the end portion of the hole. Such an insert can easily be made by bending a metal strip.

Expediently, the metal strips are provided on at least one of their edges with at least one bent projection. Said projections can be in holding engagement with the narrow sides of the retaining pin provided with the cutter-like webs, so that the part to be fastened can be connected with the dowel-like sleeve by pre-assembly.

The metal strips constituting the insert can also be connected with each other by a lateral web portion.

Expediently, the legs of the insert constituting the metal strips are provided with outwardly bent end portions, which radially engage in recesses provided at the lower end of the sleeve. In the pre-assembled sleeves said bent end portions are disposed inside the imaginary enclosing shell of the sleeve, so that they do not disturb the insertion of the sleeves in pre-drilled holes. However, they have such a length that when the legs of the insert are urged apart by turning the pin, they emerge from the enclosing cylinder of the sleeve and cuttingly engage in the wall of the predrilled hole.

According to another embodiment of the invention it is provided that the metallic insert is inserted in a recess in the sleeve which is approximately rectangular in a side view. In this embodiment the fastening element is anchored by urging apart the strip-shaped legs of the insert.

To improve the anchorage of the insert in the bore, the strip-shaped legs are expediently provided with bent-out tongues having sharp-edged end portions.

In accordance with a particularly advantageous embodiment of the invention it is provided that between its head and its shank portion the pin is provided with a thickened collar having a cam-like eccentric cross-section, which is disposed in a bore section of the fastening bore or the sleeve, and which has such a cross-section that the pin can only make about a quarter turn. The assembly is facilitated in this way, because the fitter need not especially take care to only make for instance a quarter turn of the pin with the screw driver. For fastening purposes, the fitter can turn the pin until it stops, without having to take care that only about a quarter turn is made.

Expediently, the pin has an upper shank portion with a self-cutting thread, which above the insert cuts into the bore of the sleeve. In this way the dowel-shaped sleeve is connected with the member to be fastened during the pre-assembly.

For connecting the pin with the member to be fastened, said pin can also have a broadened collar between its head and its shank, with the cross-section of said collar corresponding to the cross-section of the beaded fastening hole, and at its bottom end the collar is provided with a bead broadening the same, which rests against the rim of the beaded hole. In this way, the pin is rotatably held on the part to be fastened, but is undisplaceable in axial direction. The bead broadening the collar can for instance be formed by pressing.

According to another embodiment the pin is provided at the bottom end of its shank with a broadened rivet head, on whose rim the ends of the strip-shaped legs of the insert are supported when the insert is not urged apart.

Embodiments of the invention will subsequently be described in detail by means of the drawing, wherein

BEST MODE FOR CARRYING OUT THE INVENTION

Figure 1:
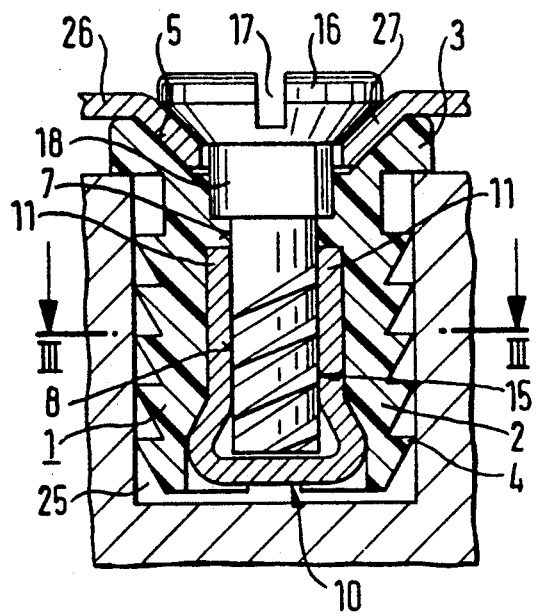
FIG. 1 shows longitudinal section through a first embodiment of a fastening element in the unspreaded assembly position.
Figure 2:
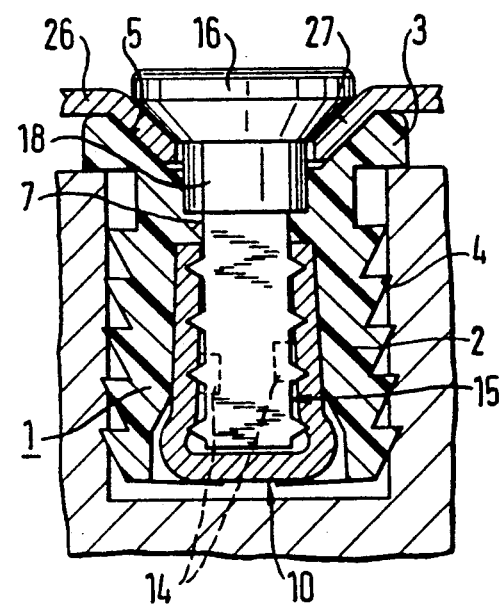
FIG. 2 shows a representation of the fastening element in accordance with FIG. 1 in the assembled position, in which the pin has been turned by about 90 degrees as against the representation in FIG. 1.
Figure 3:
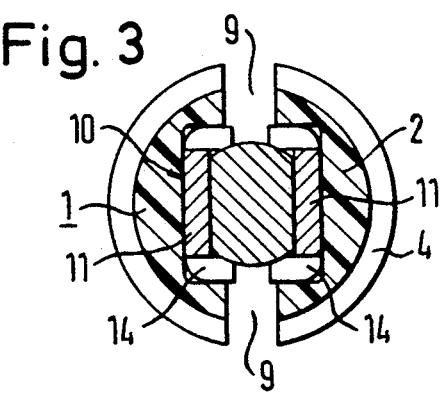
FIG. 3 shows a cross-section through the fastening element along line III—III in FIG. 1.
Figure 4:
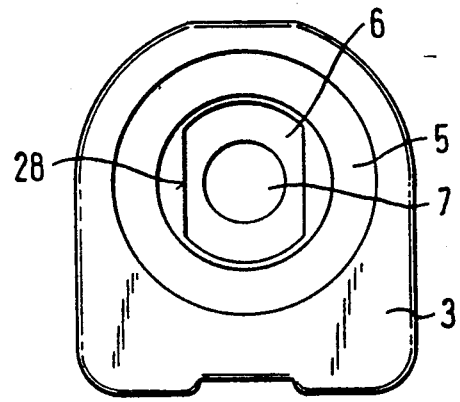
FIG. 4 shows a top view of the dowel-shaped sleeve.
Figure 5:
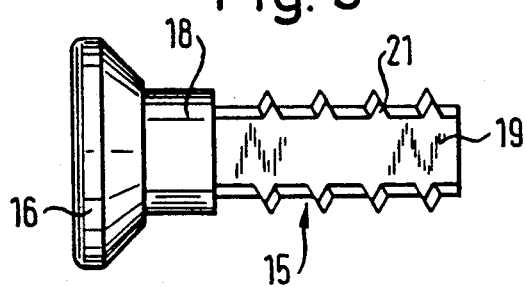
FIG. 5 shows a side view of the pin.

The fastening element shown in FIGS. 1 to 7 consists of a dowel-shaped sleeve 1 of plastic material, which substantially comprises a cylindrical shank portion 2, which at its upper end has a flange-like broadened portion 3. The shank portion 1 is provided on its shell with ring-shaped grooves, which in cross-section form a serrated profile 4, where the teeth have about radial flanks and bevelled flanks adjoining the same, which are inclined in the direction toward the bottom end of the sleeve, so that the serrated profile has a locking effect in pull-out direction.

The upper flange-like end portion of the sleeve has the shape of a circular disk up to about the longitudinal central plane, and in the adjoining portion is rectangular with rounded corners.

The sleeve 1 has a through hole with differently formed sections. In the vicinity of its upper flange-like broadened portion the sleeve has a section 5 in the shape of a hollow truncated cone. Adjoining this funnel-shaped section is a bore section 6, which has the shape of a rectangle with rounded narrow sides. Section 6 is followed by a circular bore section 7, which behind a step broadens into a bore section 8 with approximately rectangular cross-section. In the lower end portion the bore section with rectangular cross-section broadens in a funnel-shaped manner toward the end.

The shank portion of the sleeve 1 provided with the serrated ring profile 4 is provided on opposite sides with longitudinal slots 9 which are located in a common longitudinal central plane and end below the flange-like portion 3.

In the bore section 8 with rectangular cross-section a metallic insert 10 is inserted, which consists of a strip-shaped blank bent in an approximately U-shaped manner. The insert 10 comprises two protruding strip-shaped legs 11, which rest against opposing walls of the hole section 8 with rectangular cross-section, and whose upper ends abut against the step of the bore section 7. In the direction toward the connecting web 12 the strip-shaped legs 11 are outwardly bent at an angle, where this portion of the insert 10, which is about triangular in a side view, is disposed in the lower broadened hole section.

At their lateral edges the straight parts of the strip-shaped legs 11 are provided with inwardly bent projections 14, which are vertically offset on the same sides, with this offset corresponding to the pitch of the self-cutting thread of the pin 15.

Figure 6:
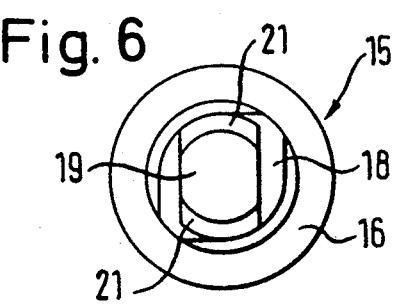
FIG. 6 shows a bottom view of the pin.
Figure 7:
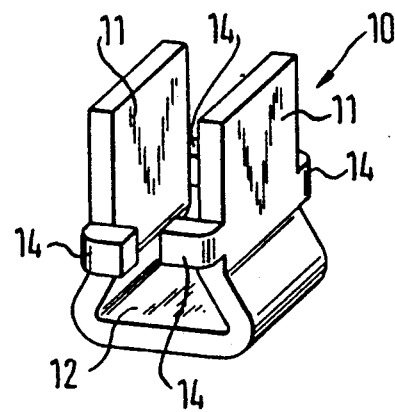
FIG. 7 shows a perspective view of the metallic insert.

The pin 15 has a retractable head 16, which is provided with a slot 17 for engagement by a screw driver. The head 16 is followed by a collar-shaped part 18, which in cross-section has an about rhombic design as is shown in FIG. 6, where the larger angular portions are rounded off, and the diameter between the smaller angular portions approximately corresponds to the diameter of the rounded portion of the bore section 6.

The collar portion 18 is followed by a shank portion 19, which has the shape of a cylindrical self-cutting screw, which is flattened on opposing sides down to the core portion. As can be seen from FIG. 6, the shank portion thus has an approximately rectangular cross-section, where the narrow sides are formed by the maintained parts of the self-cutting screw with the sections 21 of the threads.

The fastening element shown in FIGS. 1 to 7 can already be pre-assembled in the factory, so that for assembly purposes it must merely be inserted in drilled cylindrical blind holes 25 in a piece of furniture or the like.

For the pre-assembly, the insert 10 is inserted from the bottom into the dowel-shaped sleeve 1, until the upper ends of the strip-shaped legs 11 are supported on the step of the bore section 7. The sleeve 2 with the insert 10 is then attached to the bottom side of a fastening bore of a member 26 to be fastened, which can for instance be the flange of a pot-like hinge member, such that the bore edge 27 beaded in the shape of a truncated cylinder engages in the complementary bore section 5 of the sleeve. Then, the pin 15 is inserted from the top, namely such that the flattened flanks of the shank portion 19 rest against the inner sides of the metallic strip 11, without urging the same apart. The inwardly bent projections 14 fixingly engage in the arc-shaped threads 21, so that the pre-assembled fastening element is undetachably held at the member 26 to be fastened.

When after the insertion of the dowel-shaped sleeve 2 into the pre-drilled hole 25 the pin 15 is turned by about 90 degrees, the eccentric portions of the shank 19 are urging the strip-shaped legs 11 apart, so that the sleeve 2 is also urged apart and is strutted at the walls of the hole 25. In the process, the serrated profiles 4 cut into the wall of the bore 25, which leads to a good anchorage.

During a rotation by 90 degrees the opposing more acute angular portions of the collar-like section 18 abut against the planar flanks 28 of the bore section 6, so that an overturning is prevented.

When the pin 17 is turned back by 90 degrees, the fastening element can be pulled out again from the bore 25 and can later on be inserted again for a new anchorage.

The approximately rectangular portion of the flange of the dowel-shaped sleeve can at the same time serve as protection against torsion, in that said portion abuts against a stop of the member to be fastened.

In the embodiment in accordance with FIG. 8 to 13 the dowel-shaped sleeve 2 of plastic material comprises a first cylindrical bore section 30, in which engages a downwardly beaded rim 31 of the fastening bore of the member 32 to be fastened. The bore enclosed by the beaded rim 31 has the cross-section shown in FIG. 13, which consists of a circle with opposing flattened sides 33.

Figure 10:
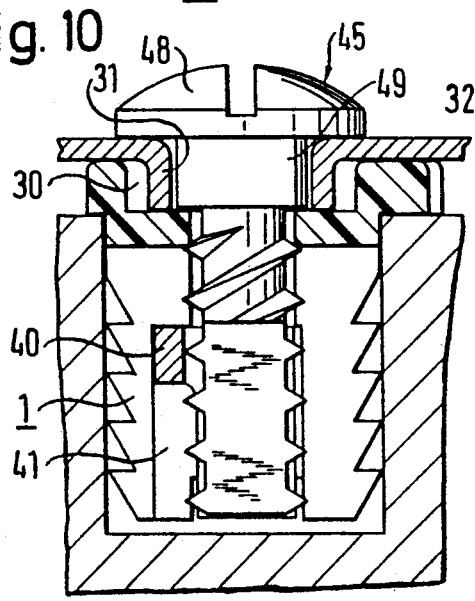
FIG. 10 shows a longitudinal section through the fastening element rotated by 90 degrees with respect to FIG. 8.
Figure 11:
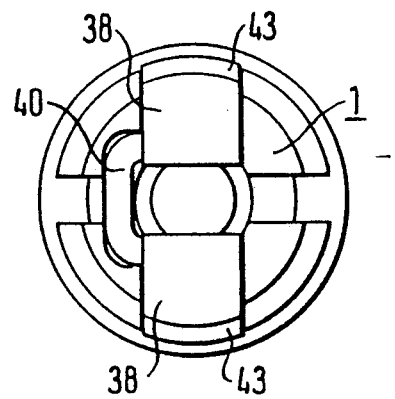
FIG. 11 shows a bottom view of the dowel-shaped sleeve with metallic insert.
Figure 12:
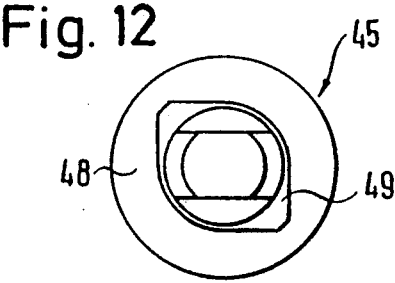
FIG. 12 shows a bottom view of the pin, FIG. 13a and b show cross-sections through the thickened collar portion of the pin in the vicinity of a recess of the dowel-shaped sleeve, which defines the angle of rotation, in the assembling position and in the assembled position rotated by 90 degrees.
Figure 13:
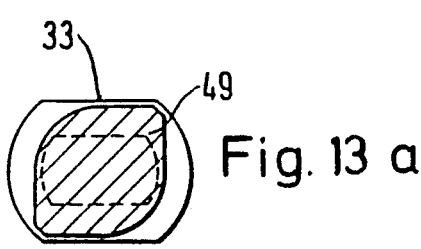
Figure 13:
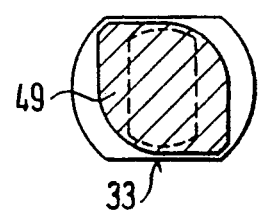

The bore section 30 is followed by a further cylindrical bore section 34. Said bore section 34 is followed by a bore section 35 with approximately rectangular cross-section, in which the insert 36 is inserted. The insert 36 consists of two mutually parallel metal strips 37, whose lower end portions 38 are bent to the outside and are located in recesses 39 in the lower end portion of the sleeve 2. The two metal strips 37 are connected with each other by a laterally disposed clamp 40. Said clamp is located in a lateral portion 41 of the bore section 35 approximately rectangular in cross-section, so that the bore section 35 is asymmetrical in a longitudinal plane as is shown in FIG. 10.

The bent end portions 38 of the metal strips 37 are provided with rounded cutter-like members 43 at their radially outwardly extending end portions.

The pin 45 has a slotted head 48 and below said head a collar-like portion 49 in the shape of a rhombus with rounded larger angular portions. The collar 49 is followed by a threaded shank portion, with the self-cutting thread cuttingly engaging in the walls of the cylindrical bore section 34 for pre-assembly purposes. The shank portion with self-cutting thread is followed by a shank portion whose opposing sides are flattened in the manner indicated in FIG. 13 by broken lines. At the narrow rounded sides of the shank the self-cutting threads were maintained in the manner shown in FIG. 8.

The collar 49 can be rotated by 90 degrees in the fastening bore formed by the beaded rim 31 as it is shown in FIGS. 13a and 13b.

Figure 8:
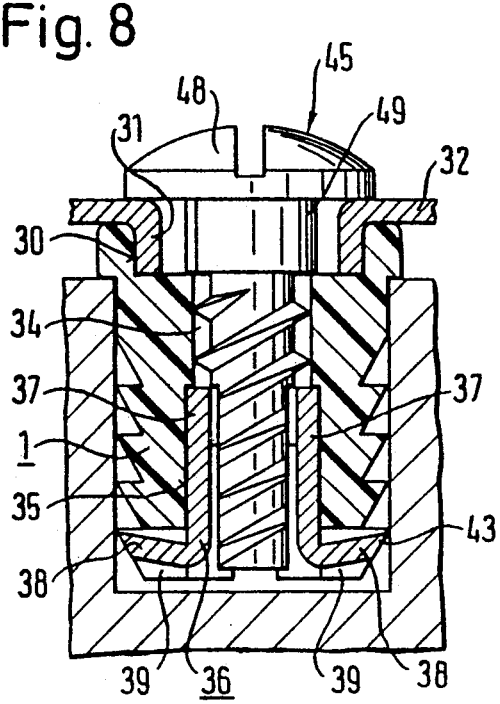
FIG. 8 shows a longitudinal section through a second embodiment of a fastening element in the unspreaded assembling position.
Figure 9:
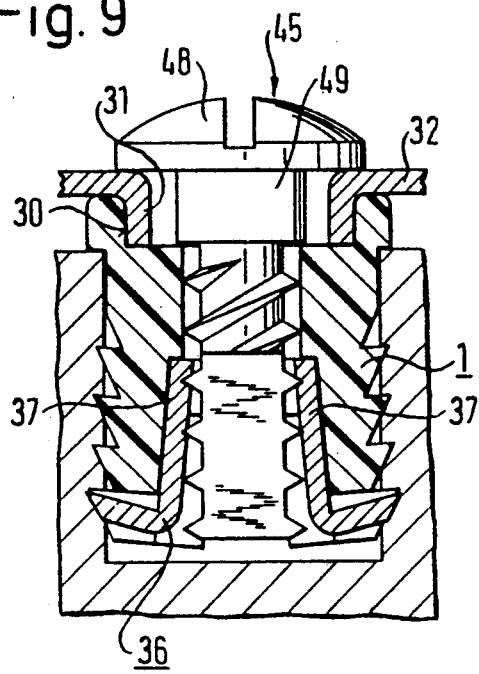
FIG. 9 shows a representation of the fastening element in accordance with FIG. 8 in the spreaded assembled position.

When, proceeding from its assembly position shown in FIG. 8, the pin 45 is turned by 90 degrees to its assembled position shown in FIG. 9, the portions of the pin 45, which are provided with self-cutting threads only on opposing sides, are urging the strip-shaped legs 37 apart and thus also the cylindrical half-shells of the sleeve 2. At the same time, the points or cutting edges emerge from the enclosing cylinder of the sleeve and in addition cut into the walls of the predrilled hole.

The pre-assembled position of the fastening element is secured in that the insert 36 is fixed in the sleeve, and the sleeve is fixed at the pin in that the upper fully existing self-cutting threads of the pin 45 cut into the upper cylindrical bore section 34.

In the embodiment in accordance with FIGS. 14 to 18 the sleeve 50, which likewise consists of an injection moulded part of plastic material, has a rectangular recess 51 which is freely extending in downward direction. In said recess an insert 52 is inserted, which consists of two mutually parallel metal strips 53. Said metal strips 53 are connected with each other by an upper laterally disposed web 54.

In their bottom end portions and in their middle portion the two strips 53 are provided with bent out tongues 56, whose ends have cutter-like edges. Between the upper bent-out tongue and the lower tongues the metal strips 53 are cranked toward the inside.

Below its cross-slotted head 59 the pin 58 has a collar 60 in the shape of a cylinder section, which penetrates through the hole 61 of the member 62 to be fastened, which was formed by the cylindrical bead. After its insertion into the beaded hole, the collar 60 is provided at its lower edge with a broadened bead 64 by means of pressing, which bead is supported on the lower edge portion of the beaded hole in the manner shown in FIGS. 14 and 15, so that the pin is rotatably, but axially stationarily held in the beaded hole 61. Below its collar 60 the pin 58 is provided with a shank portion 65, which has a self-cutting thread 66. Below the portion 65 the shank of the pin is flattened on opposing sides 67 in the manner described by means of the two preceding embodiments, so that the self-cutting threads are only present on the rounded opposing parts.

Figure 14:
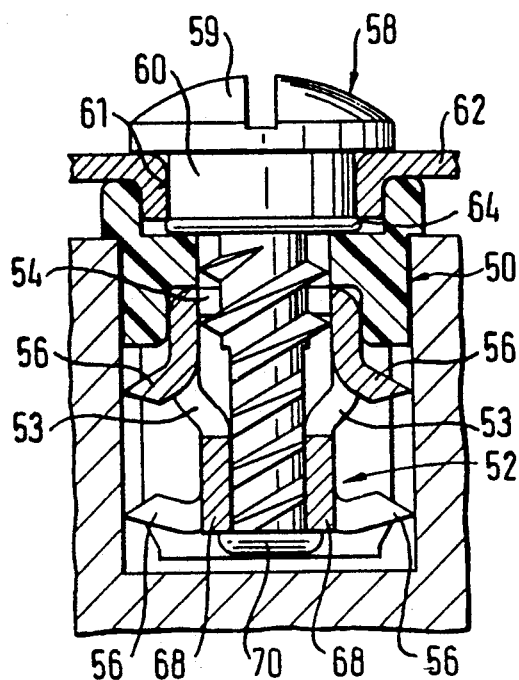
FIG. 14 shows a longitudinal section through a third embodiment of a fastening element in the unspreaded assembling position.

In the assembling position shown in FIG. 14 the lower cranked portions 68 of the strips 53 rest against the flattened sides 67 of the pin. On its lower end the pin 58 is provided with a rivet head 70, on whose rim the lower edges 71 of the insert 52 are supported in the assembling position, so that the fastening element is securely held at the member 62 to be fastened in its pre-assembled position.

Figure 15:
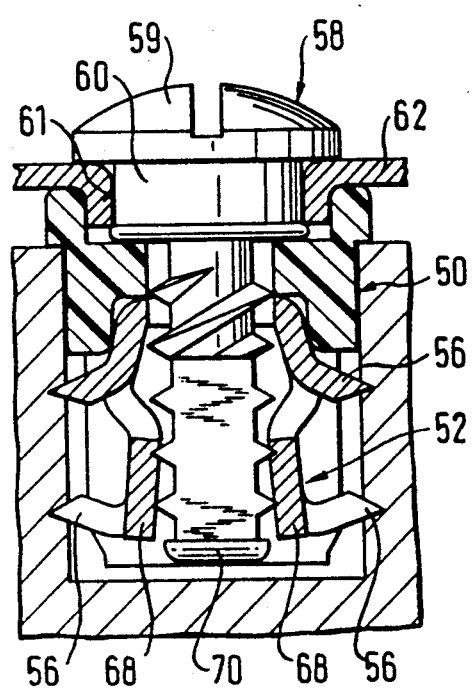
FIG. 15 shows a longitudinal section through the fastening element in accordance with FIG. 14 in the assembled position.
Figure 16:
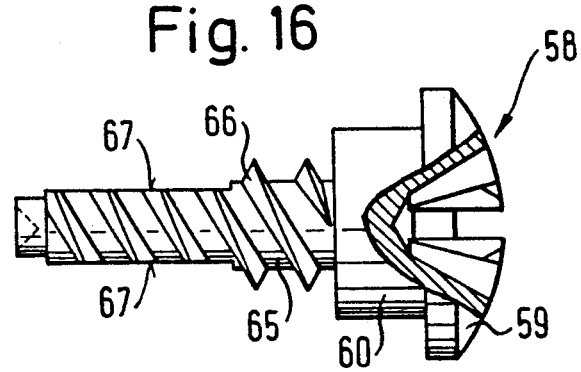
FIG. 16 shows a side view of the pin.
Figure 17:
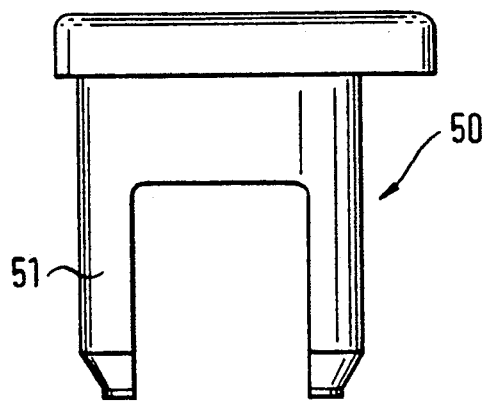
FIG. 17 shows a side view of the dowel-shaped sleeve.
Figure 18:
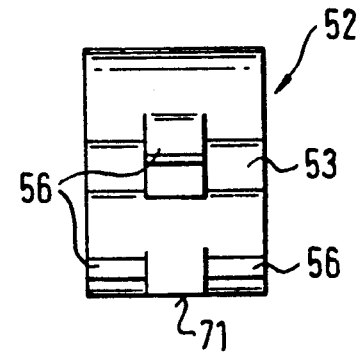
FIG. 18 shows a side view of the metallic insert.

When the pin 68 is turned by about 90 degrees in the manner shown in FIG. 15, the strip-shaped legs 53 are outwardly urged apart, with the cutter-like edges of the bent-out tongues 56 engaging in the walls of the pre-drilled hole. The self-cutting threads cut into the strip-shaped legs 53 in the manner shown in FIG. 15.

I claim:

1. A fastening element for a member provided with a fastening bore, preferably for a hinge member, having a dowel-shaped sleeve with a through hole insertable into a pre-drilled hole, a pin provided with a head that can be locked in said through hole by about a quarter turn, characterized in that the sleeve comprises a tubular shank of elastic material with at least one longitudinally extending slot having a hole formed in the slotted portion thereof with a longitudinal cross-section, and a shank formed on the pin, said pin shank having opposing narrow sides and at least one section with a cross-section approximately corresponding to the cross-section of said slotted portion hole, which shank, on said opposing narrower sides, is provided with peripherally extending thread-like cutting webs, and embedded metal strips in opposing walls of the sides of a section of said through hole.

2. The fastening element according to claim 1, further comprising an upper shank portion on the pin, said upper shank portion having a self-cutting thread formed thereon for cutting thread into a bore section of the sleeve.

3. The fastening element according to claim 1, further comprising a rim formed on the end of said through hole near said pin head, a broadened collar formed between the pin head and said pin shank, said collar having a diameter that corresponds to the diameter of the fastening bore, said collar having at its lower end a bead adjoining a portion of the through hole broadening said collar, which bead rests against said rim of the through hole.

4. The fastening element according to claim 1 characterized in that the shank of the pin further comprises a self-cutting screw, whose threads are cut away on opposing sides of the pin.

5. A fastening element for a member provided with a fastening bore, preferably for a hinge member, having a dowel-shaped sleeve with a through hole insertable into a pre-drilled hole, a pin provided with a head that can be locked in said through hole by about a quarter turn, characterized in that the sleeve comprises a tubular shank of elastic material with at least one longitudinally extending slot having a hole formed in the slotted portion thereof with a longitudinal cross-section, and a shank formed on the pin, said pin shank having opposing narrow sides and at least one section with a cross-section approximately corresponding to the cross-section of said slotted portion hole, which shank, on said opposing narrower sides, is provided with peripherally extending thread-like cutting webs, and embedded metal strips in opposing walls of the sides of a section of said through hole, said metal strips have a laterally disposed web portion for connecting said strips with each other.

6. A fastening element for a member provided with a fastening bore, preferably for a hinge member, having a dowel-shaped sleeve with a through hole insertable into a pre-drilled hole, a pin provided with a head that can be locked in said through hole by about a quarter turn, characterized in that the sleeve comprises a tubular shank of elastic material with at least one longitudinally extending slot having a hole formed in the slotted portion thereof with a longitudinal cross-section, and a shank formed on the pin, said pin shank having opposing narrow sides and at least one section with a cross-section approximately corresponding to the cross-section of said slotted portion hole, which shank, on said opposing narrower sides, is provided with peripherally extending thread-like cutting webs, and embedded metal strips in opposing walls of the sides of a section of said through hole, legs formed on said metal strips, each of said legs having outwardly bent end portions, which end portions engage in recesses formed in the bottom end of the sleeve through hole.

7. The fastening element according to claim 6, wherein said bent end portions further comprise cutter-like edges.

* * * * *